United States Patent [19]
Monzen

[11] Patent Number: 5,801,502
[45] Date of Patent: Sep. 1, 1998

[54] MANUAL TO POWER CONTROLLER FOR VEHICLE DOOR MOVEABLE BETWEEN OPEN AND CLOSED POSITIONS

[75] Inventor: Tomoaki Monzen, Yokohama, Japan

[73] Assignee: Ohi Seisakusho Co., Ltd., Yokohama, Japan

[21] Appl. No.: 715,408

[22] Filed: Sep. 18, 1996

[30] Foreign Application Priority Data

Oct. 2, 1995 [JP] Japan .................. 7-254992

[51] Int. Cl.$^6$ .................. G60J 5/06; G05B 19/28; H02P 3/00
[52] U.S. Cl. .................. 318/286; 318/280; 318/282; 318/266; 49/32; 49/139
[58] Field of Search .................. 318/280–289, 318/262–275, 440–470, 432, 433, 434, 471; 49/32, 139, 449, 280, 360

[56] References Cited

U.S. PATENT DOCUMENTS

| 4,463,296 | 7/1984 | Tada et al. ............... 318/452 |
| 4,933,610 | 6/1990 | Memmola ................ 318/282 |
| 4,962,337 | 10/1990 | Creed ..................... 318/280 |
| 4,983,896 | 1/1991 | Sugiyama et al. ......... 318/286 |
| 5,220,634 | 6/1993 | Yaguchi et al. ........... 388/819 |
| 5,434,487 | 7/1995 | Long et al. .............. 318/286 |
| 5,486,759 | 1/1996 | Seiler et al. ............. 318/489 |
| 5,578,912 | 11/1996 | Mizuta et al. ............ 318/434 |

FOREIGN PATENT DOCUMENTS 6-344773 12/1994 Japan .

*Primary Examiner*—Paul Ip
*Attorney, Agent, or Firm*—Foley & Lardner

[57] ABSTRACT

A manual to power controller suitable for a vehicle door such as preferably a sliding door comprises a direct-current electric motor for power-moving the vehicle door, and at least one door movement detection circuit for detecting both a magnitude and a direction of an electromotive force induced in a coil of the DC motor. The induced electromotive force results from a movement of the vehicle door relative to the vehicle body with the motor de-energized. Also provided is a microcomputer for rotatively controlling the motor in a desired rotational direction depending upon both the magnitude and the direction of the induced electromotive force to power move the vehicle door with the motor energized.

5 Claims, 5 Drawing Sheets

MANUAL TO POWER CONTROLLER FOR VEHICLE DOOR MOVEABLE BETWEEN OPEN AND CLOSED POSITIONS

BACKGROUND OF THE INVENTION

1. Field of the Invention

The present invention relates to a manual to power controller suitable for a vehicle door moveable between open and closed positions, and specifically to manual to power control suitable for an automotive vehicle such as a van with a sliding door moveable between open and closed positions relative to a vehicle body opening, and more specifically to a system which timely energizes a direct-current motor to power move a vehicle door when the door is manually moved a predetermined distance to complete the manually initiated door movement.

2. Description of the Prior Art

In recent years, there have been proposed and developed various powered vehicle door closure systems in which an electric motor can be energized to power move a vehicle door when a manual movement of the door is detected with the motor de-energized so as to move the door in the direction of the detected manual movement and consequently to complete the manually initiated door movement. One such power door closure system has been disclosed in Japanese Patent Provisional Publication No. 6-344773 (corresponding to U.S. Pat. No. 5,434,487 issued Jul. 18, 1995 to Joseph D. Long et al.). The prior art power door closure system includes a rotary-disc type manual door movement sensor for detecting both a direction of the manual door movement and a predetermined incremental distance of travel of the door manually moved. The rotary-disc type manual door movement sensor comprises an optical pulse pick-up device and a rotatable slotted disk having alternating solid and open sections of equal arc and being rotatable in synchronization with rotation of a door driving output gear. The optical pulse pick-up device includes two light sensors arranged with an internal light source, one light sensor being in the middle of the solid section and the other light sensor being on the border between the solid and open sections. The two light sensors are connected to a signal processor comprised of resistors, buffers, capacitors and flip-flops to provide pulse signals which are representative of both a rotational speed and a rotational direction of the slotted disk (i.e., the travel of the door and the manual movement direction of the door). The previously-noted rotary-disc type manual movement sensor is expensive because of its complicated and large-sized structure, and thus results in comparatively high total production costs of the prior art system. Also it is troublesome to install the rotary-disc type manual movement sensor assembly in a limited space of the vehicle.

SUMMARY OF THE INVENTION

Accordingly, it is an object of the invention to provide an improved manual to power controller which avoids the foregoing disadvantages of the prior art.

It is another object of the invention to provide a manual to power controller which ensures easy detection of a manual movement of a power-moveable object such as a sliding door of an automotive vehicle, in a door opening or closing direction and properly and timely control a direct-current motor used for power closing or power opening of the power-moveable object (the vehicle door) on the basis of detection results.

In order to accomplish the aforementioned and other objects of the invention, a manual to power controller for a power-moveable object of an automotive vehicle comprises a direct-current electric motor for power-moving a power-moveable object mounted on an automotive vehicle, detection means for detecting both a magnitude and a direction of an electromotive force induced in a coil of the motor; the induced electromotive force resulting from a movement of the power-moveable object relative to a vehicle body with the motor de-energized, and control means for rotating the motor in a desired rotational direction depending upon both the magnitude and the direction of the induced electromotive force to power move the power-moveable object with the motor energized. The control means rotates the motor in the desired rotational direction when the magnitude of the induced electromotive force exceeds a predetermined threshold. It is preferable that the control means rotates the motor in the desired rotational direction when the magnitude of the induced electromotive force continuously exceeds a predetermined threshold for a predetermined period of time. The magnitude of the induced electromotive force may preferably be detected in the form of a potential difference between potentials appearing at both ends of the coil of the motor owing to the movement of the power-moveable object relative to the vehicle body with the motor de-energized, whereas the direction of the induced electromotive force may be determined depending upon a magnitude relationship between a potential appearing at a first terminal of the both ends and a potential appearing at a second terminal of the both ends.

DESCRIPTION OF THE PREFERRED EMBODIMENTS

Figure 1:
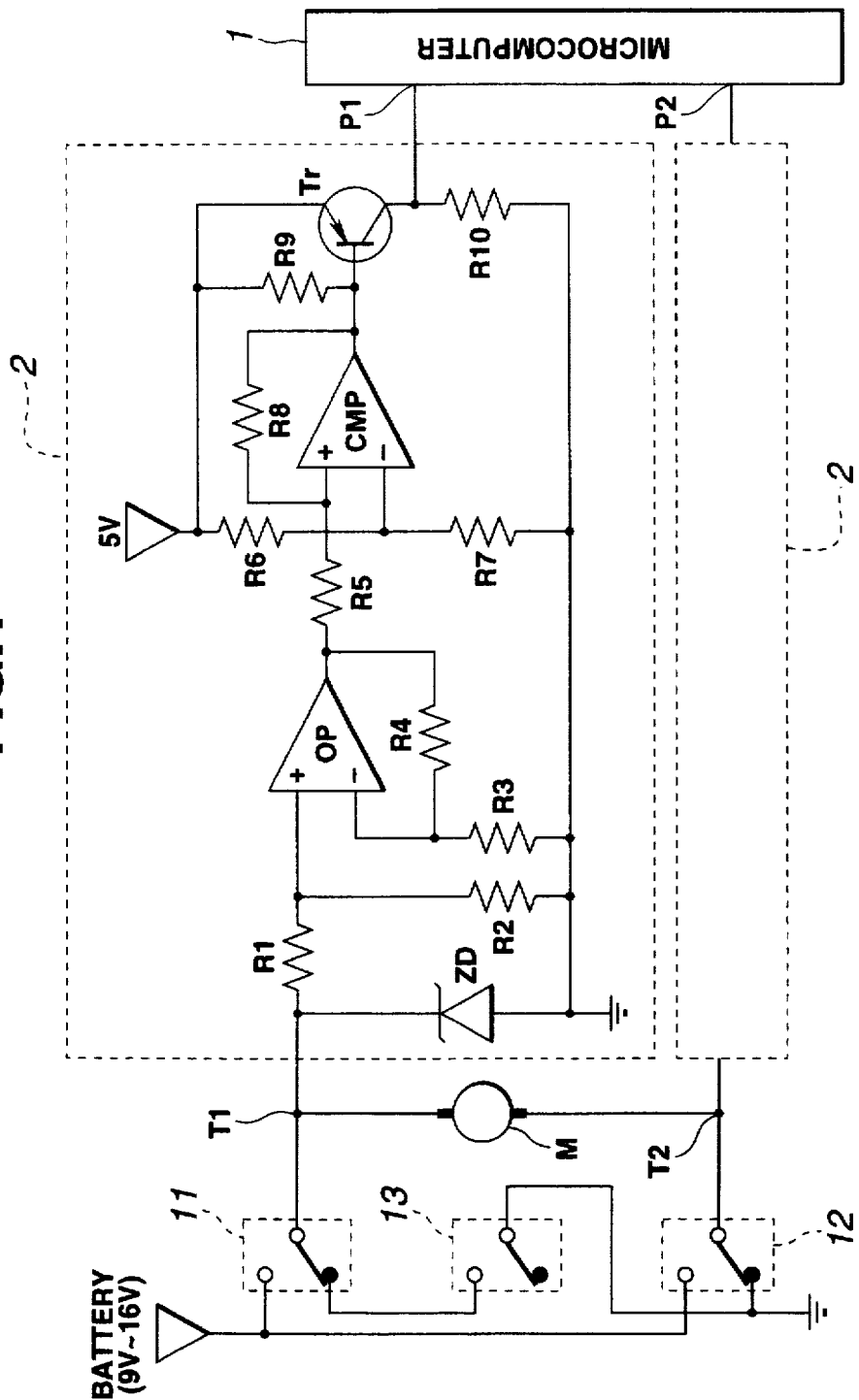
FIG. 1 is a mixed block/circuit diagram illustrating a vehicle door controller made according to the present invention.

Referring now to the drawings, particularly to FIG. 1, the vehicle door controller of the invention is exemplified in case of a door controller for a powered sliding door of an automotive vehicle. As seen in FIG. 1, M denotes a direct-current electric motor (a reversible motor) having a driving connection with a sliding-door opening/closing mechanism (not shown) and being controlled by means of a microcomputer 1. Both ends of a winding (or a coil) of the electric motor M are connected to two input terminals P1 and P2 of an input interface circuit of the microcomputer 1 through a pair of door movement detection circuits (2; 2) as will be more fully described later, such that the forward rotation of the motor produces a power opening motion of the door and such that the reverse rotation of the motor produces a power closing motion of the door. In FIG. 1, note that for the sake of illustrative simplicity, only one of the door movement detection circuits (2; 2) is shown in detail, and the other detection circuit 2 is merely shown as a blanked block, because the constructions of the two detection circuits (2; 2) are identical to each other. A first terminal T1 of the motor is connected to a relay armature (indicated by an intermediate single circle) of a door open relay 11, whereas a second terminal T2 of the motor is connected to a relay armature (indicated by an intermediate single circle) of a door close relay 12. A normally-open contact point (indicated by an upper single circle) of the open relay 11 is connected to the positive terminal of the car battery, while a normally-closed contact point of the open relay 11 is connected to a normally-open contact point (indicated by an upper single circle) of a motor brake relay 13. An armature of the motor brake relay 13 is connected to a normally-closed contact point of the close relay 12 so that the armature of the relay 13 and the normally-closed contact point of the relay 12 are both grounded. On the other hand, a normally-open contact point of the close relay 12 is connected to the battery positive terminal. Although it is not shown in FIG. 1, each of the relays 11, 12 and 13 has an exciting coil for establishing electric contact between the relay armature and the normally-open contact only when the exciting coil is energized. The energizing or de-energizing operation of the exciting coil of each relay is suitably controlled by the microcomputer 1 on the basis of detection results from the detection circuits (2; 2). As can be appreciated, when only the open relay 11 is energized or turned ON from a particular state wherein the relays 11, 12 and 13 are all turned OFF as shown in FIG. 1, electric current flows from the battery plus terminal through the normally-open contact of the open relay 11, the terminal T1, the terminal T2, the armature of close relay 12 and the normally-closed contact of the close relay 12 to ground, in that order, and whereby the flow of current from the terminal T1 to the terminal T2 causes the motor M to rotate in its forward direction and thus the sliding door is power-moved in the door opening direction. When the close relay 12 and the motor brake relay 13 are both energized or turned ON from the particular state shown in FIG. 1, electric current flows from the battery positive terminal through the normally-open contact of the close relay 12, the armature of the relay 12, the terminal T2, the terminal T1, the armature of the open relay 11, the normally-closed contact of the relay 11, the normally-open contact of the motor brake relay 13 and the armature of the relay 13 to ground, in that order, and whereby the current-flow from the terminal T2 to the terminal T1 causes the motor to rotate in its reverse direction and thus the sliding door is power-moved in the door closing direction. In lieu of the above, when only the motor brake relay 13 is activated or turned ON from the previously-noted particular state shown in FIG. 1, the two terminals T1 and T2 of the motor are short-circuited each other and whereby the motor can be forcibly braked. With the previously-noted arrangement, when the sliding door is manually opened, the motor M is forcibly rotated in the forward direction in synchronization with the manual door opening motion, with the result that an induced electromotive force results from a forward rotation of the DC motor M on the well-known Faraday's law of electromagnetic induction and hence there is a potential difference of the two terminals T1 and T2 such that the terminal T1 has a higher potential than the terminal T2. In contrast to the above, when the door is manually closed, the motor N is forcibly rotated in the reverse direction in synchronization with the manual door closing motion, with the result that an induced electromotive force results from a reverse rotation of the DC motor M and hence there is a potential difference between the two terminals T1 and T2 such that the terminal T2 has a higher potential than the terminal T1. Hereinbelow described in detail the door movement detection circuit 2 which is capable of detecting an electromotive force (the magnitude of the electromotive force) induced in the winding of the motor M and additionally determining the direction of the electromotive force (often abbreviated to emf) induced in the winding. A first door movement detection circuit is connected between the first terminal T1 of the motor and an input terminal P1 of the microcomputer 1, whereas a second door movement detection circuit 2 is connected between the second terminal T2 of the motor and another input terminal P2 of the microcomputer 1. A Zener diode ZD is connected to the terminal T1 for protecting the non-inverting input terminal of an operational amplifier OP. That is, the terminal voltage or potential of the terminal T1 is suppressed to 18 volts at maximum and maintained substantially constant (18 volts) by means of the Zener diode ZD connected to ground. The non-inverting input terminal of the operational amplifier OP is connected through a resistor R1 to the terminal T1 and connected through a resistor R2 to ground. The terminal voltage (regulated at essentially 18 volts by the Zener-diode voltage regulator ZD) appearing at the terminal T1 is divided into substantially one-half as many as its regulated voltage level (18 volts) by way of both the resistors R1 and R2 and thus a specified voltage, which is reduced or dropped across the resistor R1 to a voltage level of 9 volts at maximum, is applied to the non-inverting input terminal of the operational amplifier OP. The inverting input terminal of the operational amplifier OP is connected through a resistor R3 to ground and connected through a resistor R4 to the output of the operational amplifier OP. As may be appreciated, such connection among the resistors R1, R2, and the operational amplifier OP completes a non-inverting amplifier circuit. The output terminal of the operational amplifier OP is connected through a protective resistor R5 to a non-inverting input terminal of a comparator denoted by CMP. The protective resistor R5 functions to protect the comparator CMP by limiting the voltage level of transient voltages which might appear in a connection line between the resistor R5 and the non-inverting input terminal of the comparator. Similarly to the resistors R1 and R2, two fixed resistors R6 and R7 serve as a voltage divider for maintaining a reference voltage to be applied to the inverting input terminal of the comparator CMP at essentially constant (e.g. 1.47 volts). Actually, the resistor R6 connected between the inverting input terminal of the comparator CMP and a power source (labeled "5V") and used for the microcomputer 1, whereas the resistor R7 is connected in series to the resistor R6 with respect to the voltage source (5V) such that one end of the resistor R7 is connected to the inverting input terminal of the comparator CMP and the other end of the resistor R7 is connected to ground. In comparison of the reference voltage (1.47 volts) with the signal level of the input voltage applied from the output terminal of the operational amplifier OP through the protective resistor R5 to the non-inverting input terminal of the comparator, the comparator CMP is designed so that the output of the comparator is inverted from a low level to a high level when the input voltage signal applied to the non-inverting input terminal of the comparator exceeds the reference voltage (1.47 volts). Owing to the low to high output-voltage inversion of the comparator, a pnp transistor Tr is turned OFF, with the result that the voltage of the input terminal P1 of the microcomputer 1 is changed from a high level to a low level. A resistor R8 is connected between the non-inverting input terminal and the output terminal of the comparator for providing a proper dead band or hysteresis such as 0.21 volts. Therefore, the output of the comparator CMP may be actually changed from low to high when the input voltage signal applied to the non-inverting input terminal of the comparator becomes above the sum (1.47+

0.21=1.68 volts) of the reference voltage (1.47 volts) and the hysteresis (0.21 volts) for example. R9 denotes a base resistor connected between the base contact of the pnp transistor Tr and the voltage source marked "5V". The collector of the transistor Tr is connected through a resistor R10 to ground. With the sliding door manually opened or closed, the door movement detection circuit 2 connected to the terminal T1 basically functions to amplify the terminal voltage appearing in the terminal T1 at a predetermined amplification factor or with a predetermined gain constant as defined by (R3+R4)/R3 by way of the operational amplifier OP and to drop or step down the amplified voltage across the protective resistor R5, and additionally to compare the stepped-down voltage with the reference voltage (1.47 volts) of the comparator CMP. On the Faraday's law of electromagnetic induction, when the direct-current motor is forcibly rotated in the forward direction by the manual door opening motion, the terminal voltage or the potential of the terminal T1 becomes higher than that of the terminal T2. In this case, owing to the higher potential of the terminal T1, the voltage applied to the non-inverting input terminal of the comparator (included in the detection circuit 2 connected to the terminal T1) may exceed the reference voltage. As soon as the voltage applied to the non-inverting input terminal of the comparator becomes above the reference voltage, the output of the comparator associated with the terminal T1 is changed to a high voltage level and thus the transistor Tr is turned OFF, with the result that the voltage of the input terminal P1 is changed to a low level. In contrast to the above, when the direct-current motor is forcibly rotated in the reverse direction by the manual door closing motion, the potential of the terminal T2 becomes higher than that of the terminal T1. In this case, owing to the lower potential of the terminal T1, the voltage applied to the non-inverting input terminal of the comparator (included in the detection circuit 2 connected to the terminal T1) may remain less than the reference voltage and as a result of this the transistor Tr remains turned ON, with the result that the voltage of the input terminal P1 is maintained at a high level. As set forth above, the voltage appearing at the input terminal P1 of the microcomputer may be changed from a high level to a low level owing to the manual door opening motion, and maintained at a high level owing to the manual door closing motion. Basically, the door movement detection circuit 2 connected to the terminal T2 functions in the same manner as the detection circuit 2 connected to the terminal T1. That is, in case of the detection circuit 2 (connected between the terminal T2 and the input terminal P2), the voltage appearing in the input terminal P2 may be changed from a high level to a low level owing to the manual door closing motion, and maintained at a high level owing to the manual door opening motion. In other words, the door controller of the embodiment drives the direct-current motor when satisfying a specified condition wherein the magnitude of electromotive force induced in the motor winding owing to the manual door opening motion or the manual door closing motion exceeds a predetermined threshold, so as to optimally and timely power-move the sliding door depending on the manual door movement direction. As may be appreciated, in the embodied controller, the magnitude of the emf can be detected in the form of the potential difference between the two terminal voltages respectively appearing at the terminals T1 and T2, whereas the direction of the emf can be determined by the magnitude relationship between the voltage level of the terminal voltage appearing at the terminal T1 and the voltage level of the terminal voltage appearing at the terminal T2.

Figure 2:
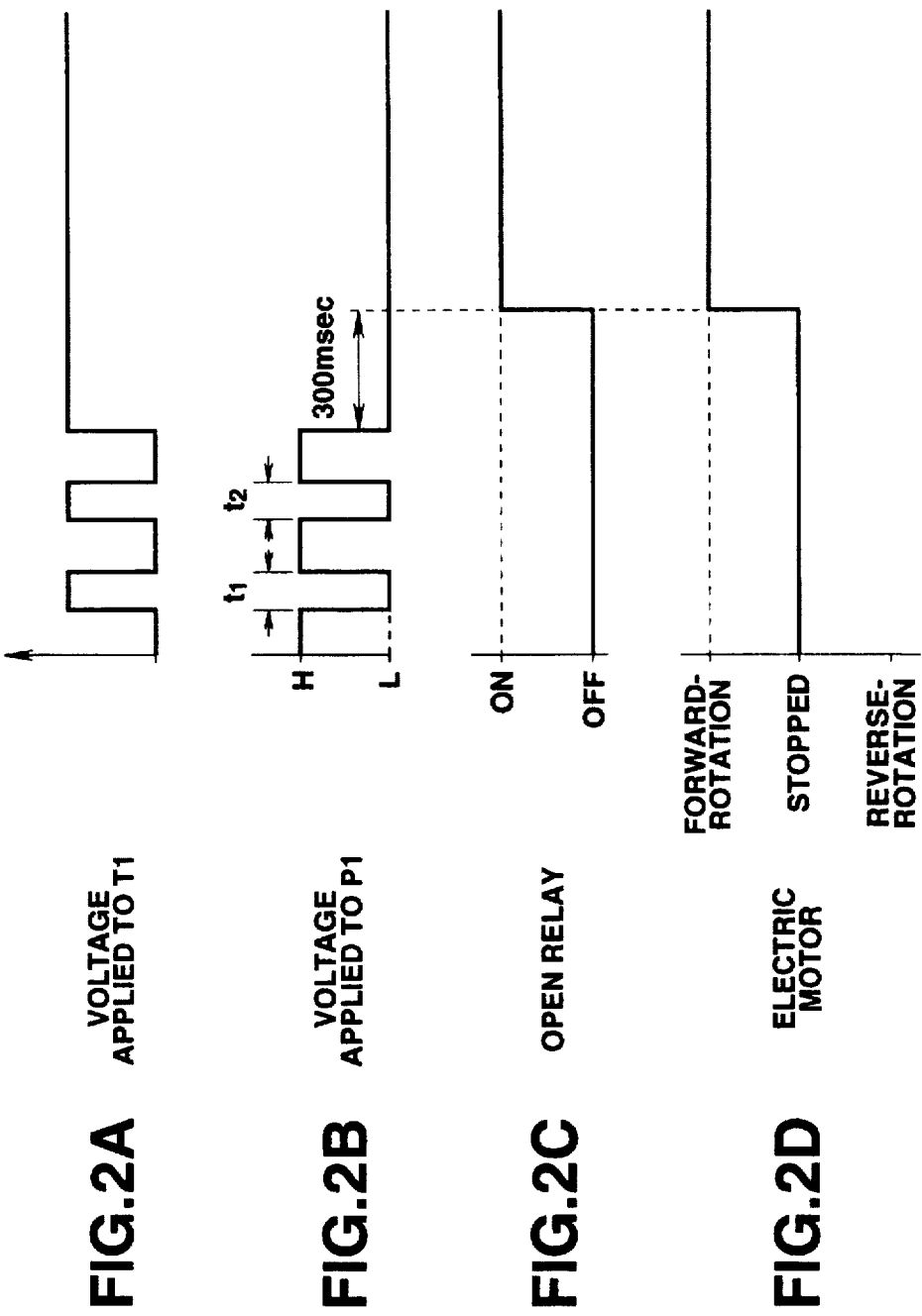
FIG. 2A, 2B, 2C and 2D are timing charts illustrating the operation of the door controller of FIG. 1.

As will be more fully explained later, the microcomputer 1 properly controls the relays 11, 12 and 13 on the basis of the voltage levels of the input terminals P1 and P2. For instance, the potential of the input terminal P1 or the voltage applied to the input terminal P1 varies as indicated by the timing chart of FIG. 2B in the event that the terminal voltage or potential of the terminal T1 varies as indicated by the timing chart of FIG. 2A.

Figure 3:
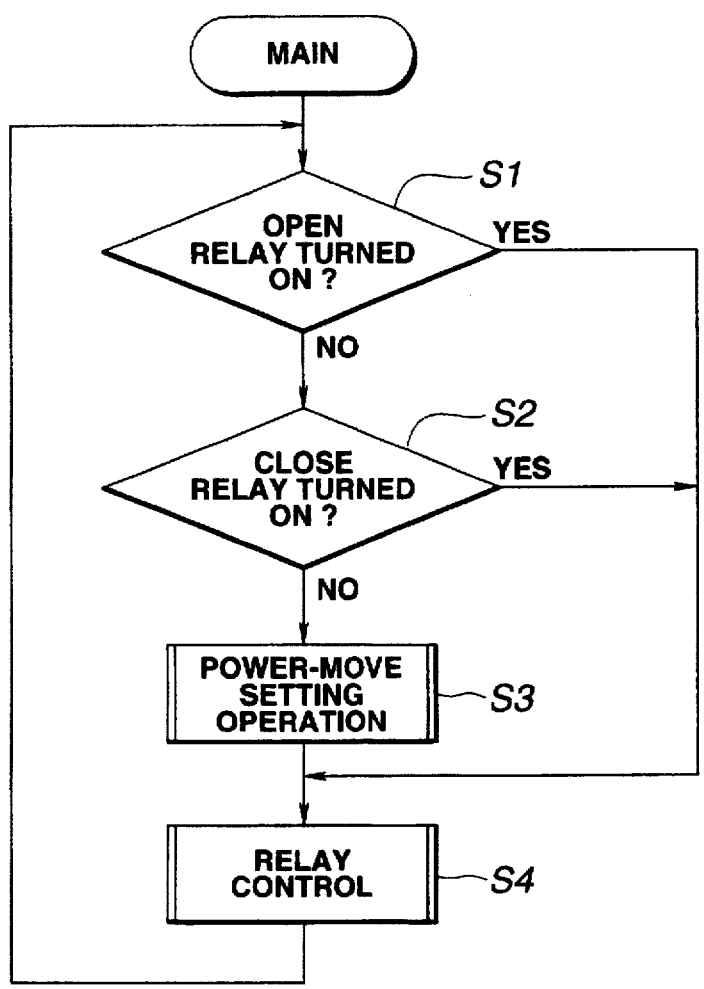
FIG. 3 is a main routine illustrating the controlling operation executed by the microcomputer employed in the door controller of FIG. 1.

Referring now to FIG. 3, there is shown a main routine executed by the microcomputer 1. In step 1, firstly, a test is made to determine whether or not the door open relay 11 is turned ON. When the answer to step S1 is affirmative (YES), the program jumps from step S1 to step S4. When the answer to step S1 is negative (NO), step S2 proceeds in which a test is made to determine whether or not the door close relay 12 is turned ON. When the answer to step S2 is affirmative, the program jumps to step S4. When the answer to step S2 is negative, step S3 enters in which the program shifts from the main routine to the sub-routine for power-move setting operation shown in FIG. 4. The sub-routine for the power-move setting operation will be described in detail in reference to FIG. 4. After step S3, step 4 proceeds in which the microcomputer executes the sub-routine for controlling the three relays 11, 12 and 13. The sub-routine for the relay control will be hereinafter explained in detail in reference to FIG. 5. In the forgoing manner, steps S1 through S5 are repeatedly executed by the microcomputer 1. As may be appreciated from the flow chart shown in FIG. 3, the two sub-routines shown in FIGS. 4 and 5 are executed under a particular condition wherein the open relay 11 and the close relay 12 are both turned OFF.

Figure 4:
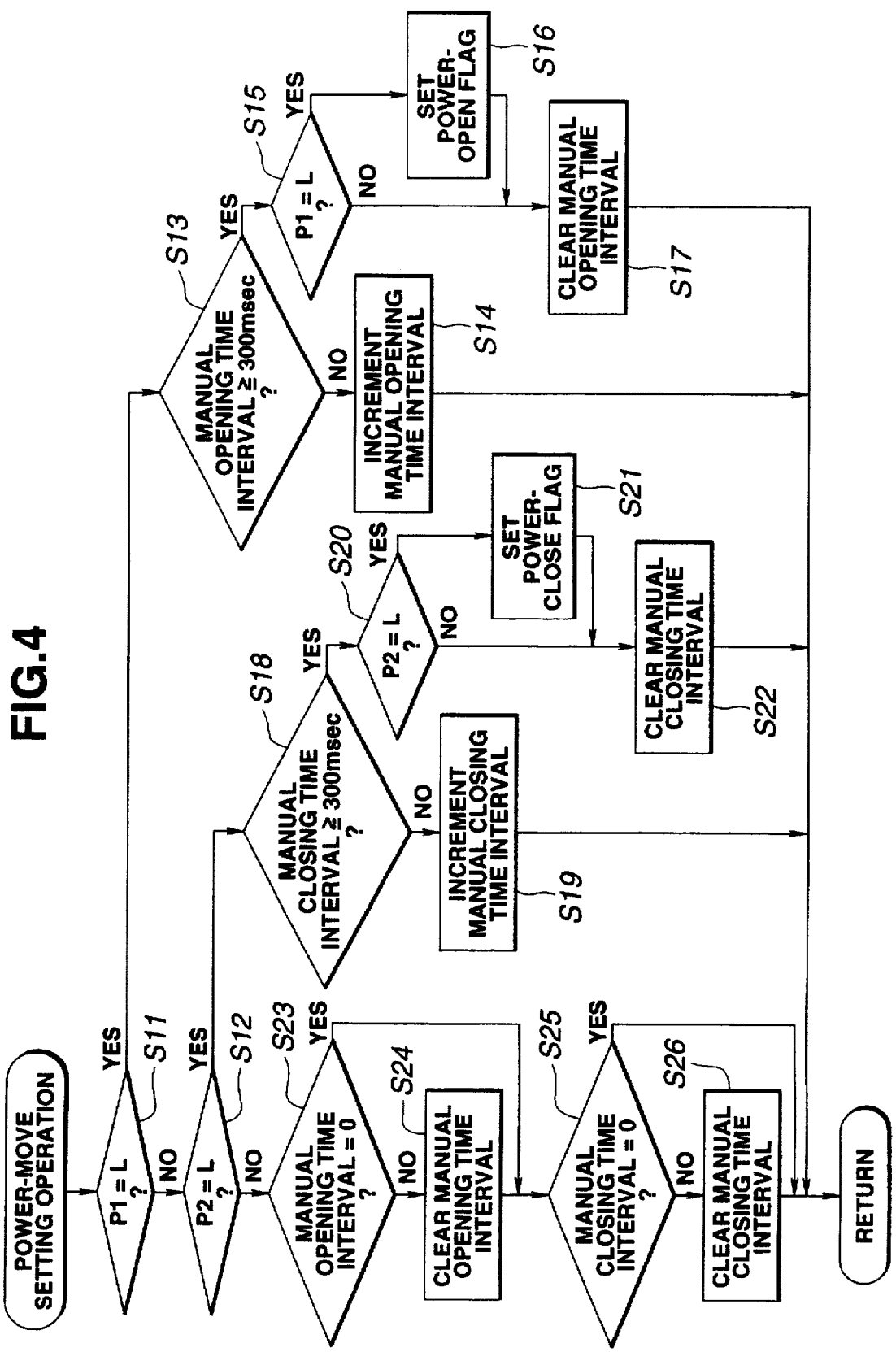
FIG. 4 is a flow chart illustrating the power-move setting or initiating operation executed through step S3 of FIG. 3.

Referring to FIG. 4, the power-move setting operation is executed as follows.

When satisfying the previously-noted particular condition, i.e., with the two relays 11 and 12 both turned OFF, the Power-Move Setting Operation sub-routine determines at step S11 whether the voltage of the input terminal P1 is a low voltage level. Subsequently to this, the routine determines at step S12 whether the voltage of the input terminal P2 is a low voltage level. In other words, steps S11 and S12 are provided to determine as to whether the sliding door is manually opened or closed. When the answer to step S11 is affirmative, i.e., the sub-routine determines at step S1 that the voltage of the input terminal P1 is within a low voltage level and thus the door is manually opening, step S13 proceeds in which a first count value calculated by a timer employed in the microcomputer 1 is compared with a predetermined period of time such as 300 msec. The first count value will be hereinafter referred to as a "manual opening time interval". When the answer to step S13 is negative (NO), i.e., in case of MANUAL OPENING TIME INTERVAL<300 msec, step S14 enters in which the manual opening time interval of the timer is incremented. In case of MANUAL OPENING TIME INTERVAL≧300 msec, step S15 proceeds in which a test is made to determine whether the voltage of the input terminal P1 remains low (L). When the answer to step S15 is affirmative, i.e., in case of P1=L, step S16 proceeds in which the power-open flag is set. Conversely, when the routine determines through step S15 that the voltage of the input terminal P1 is not maintained at a low level, step S17 enters in which the manual opening time interval counted or calculated by the timer is cleared to zero. In the foregoing manner, the power-open flag is set only when the manual opening time interval is continuously maintained at a low level for a time duration above a predetermined time period such as 300 msec. After the power-open flag has been set at step S16, the routine flows to step S17. Returning to step S11, when the voltage of the terminal P1 remains high, i.e., in case of P1=H, step S12 enters. In case that the sub-routine determines at step S12 that the voltage of the terminal P2 is within a low voltage level and thus the door is manually closing, step S18 proceeds in which a second count time of a timer employed in the microcomputer 1 is compared with a predetermined period of time. In the shown embodiment, the predetermined period of time for the second count value is set at 300 msec equal to the predetermined time period for the previously-noted first count value. The predetermined time periods for the first and second count values may be different from each other. The second count value will be hereinafter referred to as a "manual closing time interval". When the answer to step S18 is negative, i.e., in case of MANUAL CLOSING TIME INTERVAL<300 msec, step S19 proceeds in which the manual closing time interval of the timer is incremented. In case of MANUAL CLOSING TIME INTERVAL≧300 msec, step S20 proceeds in which a test is made to determine whether the voltage of the input terminal P2 remains low (L). When the answer to step S20 is affirmative, i.e., in case of P2=L, step S21 proceeds in which the power-close flag is set. Conversely, when the routine determines through step S20 that the voltage of the input terminal P2 is not maintained at a low level, step S22 enters in which the manual closing time interval counted by the timer is cleared. In the foregoing manner, the power-close flag is set only when the manual closing time interval is continuously maintained at a low level for a time duration above a predetermined time period such as 300 msec. After the power-close flag has been set at step S21, the routine flows to step 22. The provision of each predetermined time period (such as 300 msec) for the manual opening time interval and the manual closing time interval is very effective to avoid malfunction which may occur when the voltage of the respective input terminal P1 or P2 momentarily drops owing to undesired vibration or oscillatory movement of the sliding door, and consequently to enhance the reliability of the manual to power control of the controller of the invention. When two steps S11 and S12 determine that the voltage of the input terminal P1 and the voltage of the input terminal P2 are both high, i.e., P1=H and P2=H, step S23 proceeds in which the instantaneous manual opening time interval is compared with "0". When the answer to step S23 is negative (NO), step S24 enters in which the manual opening time interval is cleared to zero. When the answer to step S23 is affirmative (YES), i.e., in case of MANUAL OPENING TIME INTERVAL=0, the routine flows from step S23 to step S25. At step S25, the instantaneous manual closing time interval is compared with "0". When the answer to step S25 is negative (NO), the routine flows to step S26 at which the manual closing time interval is cleared. When the answer to step S25 is affirmative (YES), i.e., in case of MANUAL CLOSING TIME INTERVAL=0, the program is returned from the Power-Move Setting Operation sub-routine to the main routine. In other words, in the case that a specified condition defined by P1=H (P1~L) and P2=H (P2~L) is satisfied, that is in the absence of manually opening or closing door movement, it is unnecessary to count the manual opening time interval or the manual closing time interval and thus the manual opening time interval and the manual closing time interval are both cleared through steps S23, S24, S25 and S26.

Figure 5:
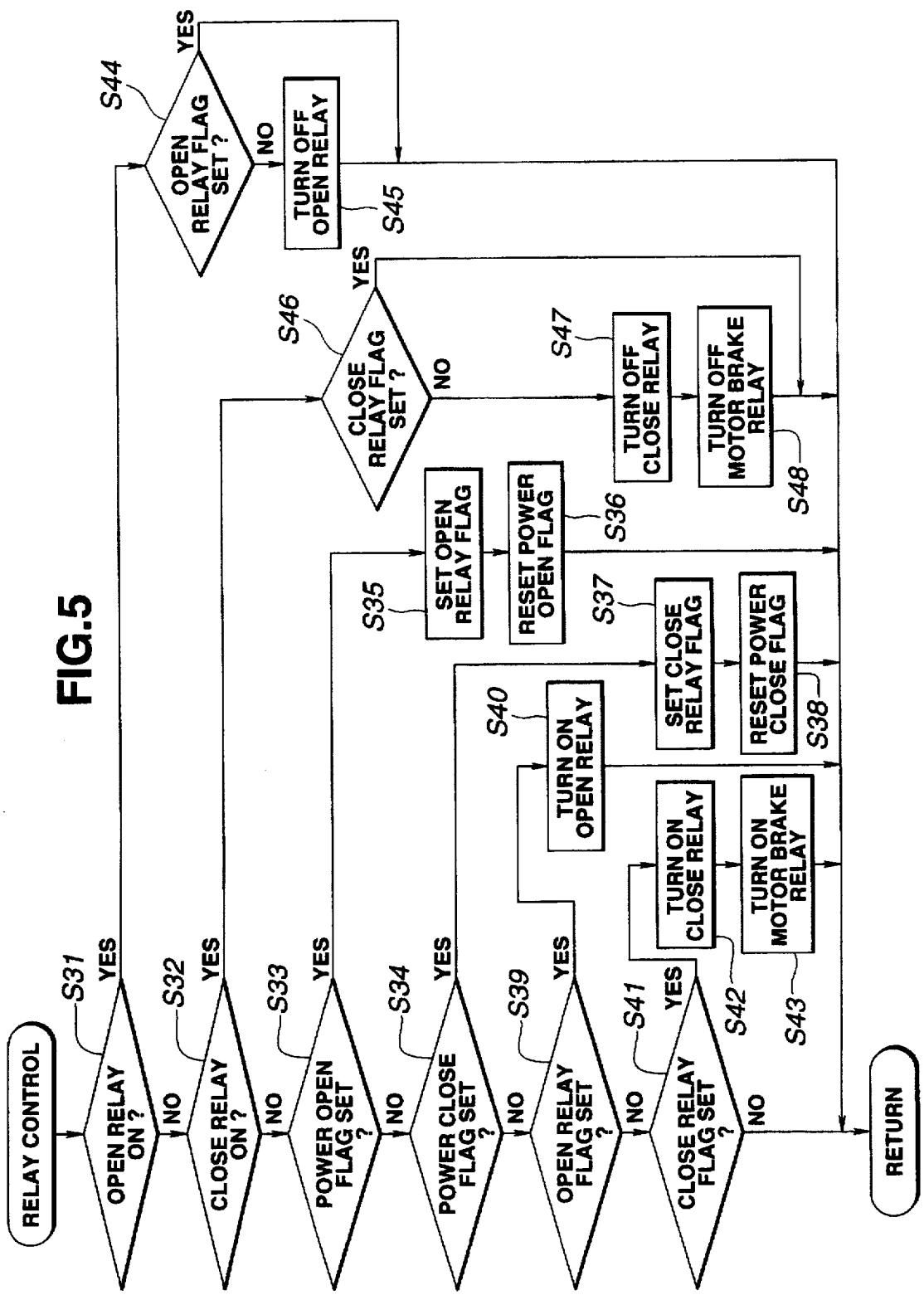
FIG. 5 is a flow chart illustrating the relay-control subroutine executed through step S4 of FIG. 3.

Referring to FIG. 5, the relay control is executed as follows.

Under a specified condition wherein neither the door open relay 11 or the door close relay 12 is turned ON (see steps S31 and S32), the Relay Control sub-routine determines if the power-open flag or the power-close flag is set (see steps S33 and S34). When step S33 indicates or determines that the power-open flag is set, an open relay flag is set at step S35 and then the power-open flag is reset at step S36. On the other hand, when step S34 indicates or determines that the power-close flag is set, a close relay flag is set at step S37 and then the power-close flag is reset at step S38. If the open relay flag is set via step S35, the door open relay 11 is turned ON through the flow from step S39 to step S40 and as a result the motor M is driven in the forward rotational direction to produce power door opening of the sliding door. On the other hand, if the close relay flag is set via step S37, the door close relay 12 is firstly turned ON through the flow from step S41 to step S42 and additionally the motor brake relay 13 is secondly turned ON at step S43, and as a result the motor M is driven in the reverse rotational direction to produce power door closing of the sliding door. Although it is not clearly shown in the flow chart of FIG. 5, the microcomputer is designed so that the open relay flag is reset when the fully-open state of the sliding door is detected, and so that the close relay flag is reset when the fully-closed state of the sliding door is detected. Returning again to step S31, when the answer to step S31 is affirmative (YES), step S44 proceeds in which a test is made to determine whether or not the open relay flag is set. When the answer to step S44 is affirmative, the program returns from the Relay Control subroutine to the main routine. In contrast, when the answer to step S44 is negative (NO), step S45 proceeds in which the open relay is turned OFF. As appreciated from the flow from step S31 via step S44 to step S45 and from the return flow from step S31 via step S44 to the main routine, the microcomputer functions to continue the power opening motion of the sliding door until the open relay flag is reset again to zero from the time when the open relay has been turned ON, and to turn OFF the open relay 11 for the purpose of stopping the direct-current motor M when the open relay flag is reset, i.e., when the fully-open state of the sliding door is detected. Similarly to the above, in step S32, when the answer to step S32 is affirmative (YES), step S46 proceeds in which a test is made to determine whether or not the close relay flag is set. When the answer to step S46 is affirmative, the program returns from this sub-routine to the main routine. In contrast, when the answer to step S46 is negative (NO), step S47 proceeds in which the close relay is turned OFF and subsequently step S48 proceeds in which the motor brake relay is turned OFF. As appreciated from the flow from step S32 through steps S46 and S47 to step S48 or the return flow from step S32 through step S46 to the main routine, the microcomputer functions to continue the power closing motion of the sliding door until the close relay flag is reset again to zero from the time when the close relay has been turned ON, and to turn OFF both the close relay 12 and the motor brake relay 13 for the purpose of stopping the DC motor M when the close relay flag is reset, i.e., when the fully-closed state of the sliding door is detected.

Referring again to FIGS. 2A, 2B, 2C and 2D, there are shown timing charts in case that the manual door opening motion is detected and then controller initiates the power door opening with the motor M rotated in the forward direction. In the case that the voltage of the input terminal P1 varies as indicated by the timing chart of FIG. 2B in response to the terminal-voltage changes (see FIG. 2A), if the manual opening time interval (as marked by t1 or t2), during which the voltage of the input terminal P1 is within a low voltage level, is below the predetermined time period such as 300 msec, the door open relay 11 remains turned OFF (see FIG. 2C) and thus the motor M remains stopped.

In the event that the manual opening state continues for a time duration above the predetermined time period such as 300 msec, the open relay is switched from the turned-OFF state to the turned-ON state. In synchronization with the switching operation of the open relay 11 to the turned-ON state, the motor M is driven in the forward rotational direction as indicated from the flow chart of FIG. 2D.

Although the controller of the previously-explained embodiment is applied to the manual to power control in both directions, namely the door closing direction and the door opening direction, in order to complete the manually initiated door movement, the controller may be applied to a manual to power control either in case of the manually initiated door opening movement or in case of the manually initiated door closing movement. As a modification of the previously discussed embodiment, in lieu of the purpose of completing the manually initiated door movement, a vehicle door may be power-closed when the door is manually opened, and/or a vehicle door may be power-opened when the door is manually closed, for the purpose of retaining an initial state of the vehicle door unchanged under a stopped condition of the vehicle on up-sloped or down-sloped roads. The door controller of the modification can perform an effective manual to power control by detecting whether the vehicle (employing the door controller) is stopped on an upwardly-sloped or downwardly-sloped road surface. For example, when a sliding door moves in its fully-closed position unintendedly when the vehicle is stopped on a down-sloped road surface, the controller may operate to power-open the sliding door against the door closing movement initiated by deadweight of the sliding door of the vehicle stopped on the down-sloped road and consequently to maintain the door in the opened state. In contrast with the above, when the sliding door moves in its fully-open position unintendedly when the vehicle is stopped on an up-sloped road surface, the controller may operate to power-close the sliding door against the door closing movement initiated by deadweight of the sliding door of the vehicle stopped on the up-sloped road and consequently to maintain the door in the closed state. As appreciated from the above, the door controller made according to the present invention can properly and timely power-move the vehicle door depending upon a manual door movement direction by a vehicle operator or a passenger or an accidental door movement which may occur in a stopped state of the vehicle on up-sloped or down-sloped roads. Additionally, according to the door controller of the invention, the manual door movement or the accidental door movement can be easily and precisely detected by detecting or monitoring terminal voltages appearing in both ends of a motor coil (or a winding) of a direct current motor used for power-move of the vehicle door, which voltages may result from electromotive force induced in the motor coil owing to the manual door movement or the accidental door movement, and thus the construction of the door movement detection means (or circuit) is very simple.

Moreover, although the embodiment is exemplified in case of a door controller of a powered sliding door of an automotive vehicle, the controller of the invention may be widely applied to another power-moveable object, such as a powered side door assembly, a motor-powered sun-roof lid assembly, a motor-powered door mirror assembly or the like.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A manual to power controller for a power-moveable object of an automotive vehicle, comprising:

a direct-current electric motor for power-moving a power-moveable object mounted on an automotive vehicle;

detection means for detecting both a magnitude and a direction of an electromotive force induced in a coil of said motor; said induced electromotive force resulting from a movement of said power-moveable object relative to a vehicle body with said motor de-energized; and control means for rotating said motor in a desired rotational direction depending upon both the magnitude and the direction of said induced electromotive force to power move said power-moveable object with said motor energized.

2. A manual to power controller as claimed in claim 1, wherein said control means rotates, said motor in said desired rotational direction when the magnitude of said induced electromotive force exceeds a predetermined threshold.

3. A manual to power controller as claimed in claim 1, wherein said control means rotates said motor in said desired rotational direction when the magnitude of said induced electromotive force continuously exceeds a predetermined threshold for a predetermined period of time.

4. A manual to power controller as claimed in claim 3, wherein the magnitude of said induced electromotive force is detected as a potential difference between potentials appearing at both ends of said coil of said motor owing to the movement of said power-moveable object relative to the vehicle body with said motor de-energized, whereas the direction of said induced electromotive force is determined depending upon a magnitude relationship between a potential appearing at a first terminal of said both ends and a potential appearing at a second terminal of said both ends.

5. A manual to power controller as claimed in claim 4, wherein said detection means comprises a pair of detection circuits (2; 2), a first detection circuit being connected between a first input terminal (P1) of an input interface circuit of said control means (1) and said first terminal (T1) and a second detection circuit being connected between a second input terminal (P2) of the input interface circuit and said second terminal (T2), each of said first and second detection circuits (2; 2) including a Zener-diode voltage regulator (ZD) for regulating a voltage appearing at said first terminal (T1) at a predetermined voltage level, a voltage divider composed of two resistors (R1, R2) for dividing substantially one-half as many as a level of voltage signal from said Zener-diode voltage regulator, a non-inverting amplifier circuit (OP, R3, R4) including at least an operational amplifier for amplifying a level of voltage signal from said voltage divider at a predetermined amplification factor, a protective resistor (R5) for stepping down a voltage signal from said non-inverting amplifier circuit, a comparator (CMP) for comparing a stepped-down voltage signal from said protective resistor with a reference voltage and for outputting an inverted comparator output depending upon a comparison result between the stepped-down voltage signal value and a reference voltage of said comparator, and a transistor connected between one of said input terminals of the input interface circuit of said control means and a voltage source (5V) for said control means for changing a voltage applied to said one of input terminals from a high voltage level to a low voltage level in presence of the inverted comparator output.

* * * * *